United States Patent [19]

Bekki et al.

[11] Patent Number: 5,101,405
[45] Date of Patent: Mar. 31, 1992

[54] RING LINE CONCENTRATOR

[75] Inventors: Yoshinori Bekki; Hiroyuki Wada, both of Hadano, Japan

[73] Assignee: Hitachi, Ltd., Tokyo, Japan

[21] Appl. No.: 251,491

[22] Filed: Sep. 30, 1988

[30] Foreign Application Priority Data

Oct. 2, 1987 [JP] Japan ................. 62-247803

[51] Int. Cl.⁵ .................. H04L 12/42; H04J 3/00
[52] U.S. Cl. ......................... 370/85.15; 370/56; 370/85.12; 340/825.05
[58] Field of Search ................. 370/58, 15, 16, 97, 370/85.7, 85.9, 85.12, 85.15, 16.1; 340/825.05, 825.5, 825.51, 827; 375/11; 379/324, 338, 340, 400

[56] References Cited

U.S. PATENT DOCUMENTS

| | | | |
|---|---|---|---|
| 4,402,075 | 8/1983 | Bargeton et al. | 370/97 |
| 4,583,088 | 4/1986 | Bux et al. | 370/86 |
| 4,663,748 | 5/1987 | Karbowiak et al. | 370/86 |
| 4,777,330 | 10/1988 | Nakayashiki et al. | 340/825.05 |

FOREIGN PATENT DOCUMENTS 0208334  9/1986  Japan.
0054040  3/1988  Japan ..................... 370/86
0149940  6/1988  Japan ..................... 370/56

OTHER PUBLICATIONS

IBM Technical Disclosure Bulletin, vol. 30, No. 2, Jul. 1987, "Token Ring Distance Extension".
"Local Area Network According to Token Ring Access Method", Bit (journal), vol. 16, No. 3, 1984.
"Token Ring Access Method and Physical Layer Specifications", IEEE Standard 802.5-1985 (pp. 23-25, 27, 37, 41-59, 76-87).
IEEE 802.5R Draft G, vol. 6 Draft Document on Reconfiguration Draft Version G-8, Sep. 86.

Primary Examiner—Douglas W. Olms
Assistant Examiner—Alpus H. Hsu
Attorney, Agent, or Firm—Pennie & Edmonds

[57] ABSTRACT

A line concentrator used in a ring network system which has line concentrators for accommodating ring lobes, and a ring trunk cable connecting adjacent line concentrators, wherein a signal transmitted from an upstream line concentrator is sent via the ring trunk cable to the ring lobes of an immediately downstream line concentrator. The line concentrator is provided with a circuit for regenerating a signal on the ring trunk cable received by the line concentrator, and repeating and sending the regenerated signal to the ring lobes.

3 Claims, 6 Drawing Sheets

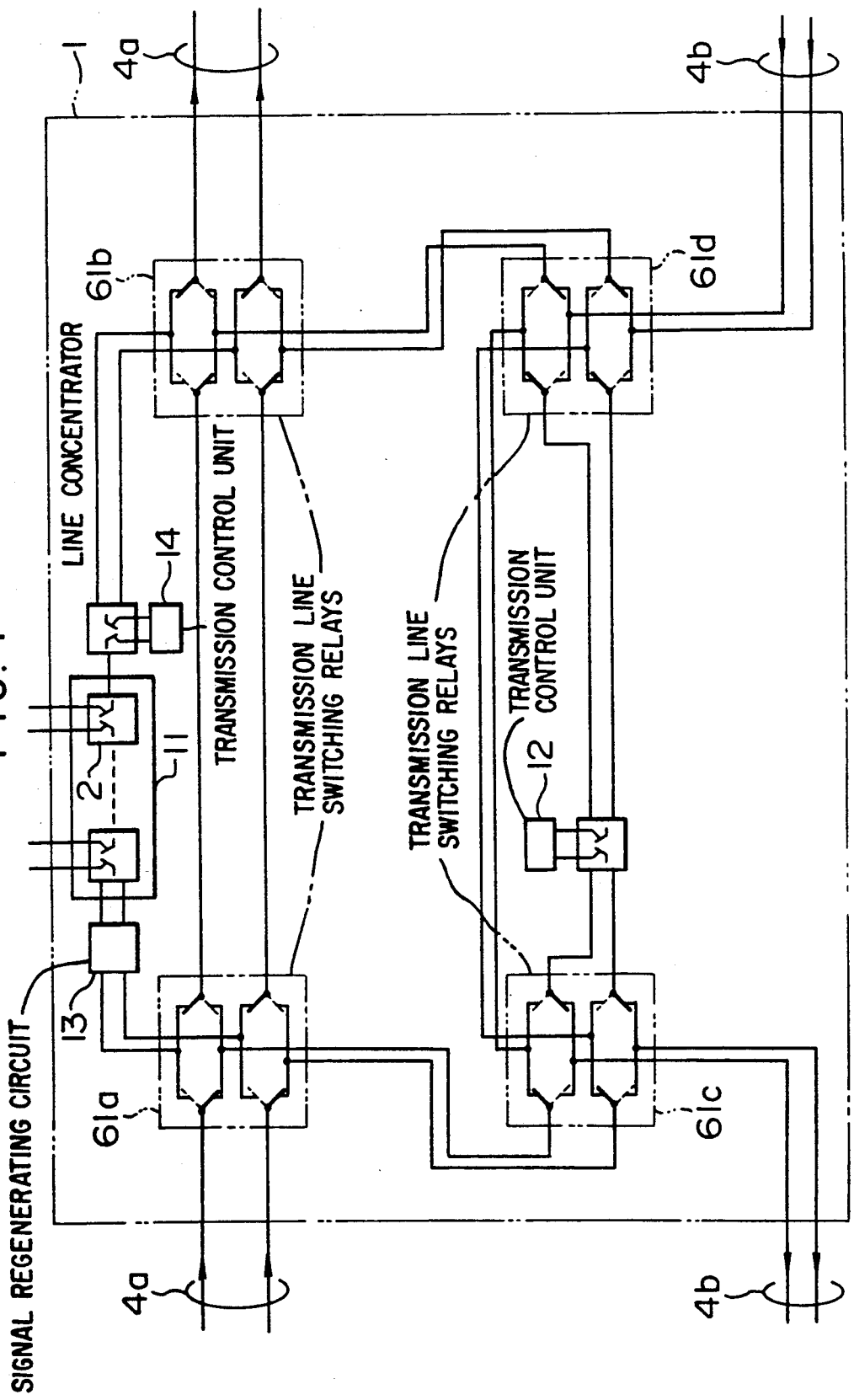

RING LINE CONCENTRATOR

CROSS-REFERENCE TO RELATED APPLICATIONS

The present invention relates to subject matter described in application Ser. No. 209,719 filed June 22, 1988, now U.S. Pat. No. 4,937,823, entitled "Ring Network Configuration" by Yoshinori Bekki, Hiroyuki Wada, Masato Hirai, and assigned to the same assignee of the present invention.

BACKGROUND OF THE INVENTION

The present invention relates to regenerating and repeating (or relaying) a transmitted signal on a ring network, and more particularly to a ring line concentrator suitable for extending a communication line.

In the conventional field of regenerating and repeating a transmitted signal, there is known, for example, a paper "Local Area Network According to Token Ring Access Method" in "Bit" magazine, Vol. 16, No. 3, 1984. According to the paper, a line concentrator (this is called as active wiring concentrator (AWC) in the paper) has a single station which has the same function (i.e., regeneration of signals, transmission of frames and the like) as those terminal stations connected to the line concentrator. This station is located downstream of the last terminal station of one or more terminal stations connected to the branch cable of the line concentrator (i.e., located at the last position of the signal flow within the line concentrator). According to the analysis of the present inventors, in, the ring, configuration of the system described in the above-identified bit magazine in case where a passive wiring concentrator is connected to the AWC lobe (branch cable), or in some other cases, the signal transmission distance from the station in an AWC to the station of the immediately downstream AWC may become long so that attenuation of a signal transmitted from the former AWC becomes great, resulting in a failure of sending the signal to the station of the immediately downstream AWC. Therefore, it becomes necessary to set up or install a ring, with a limitation that the transmission distance should be determined so as to be within the total transmission distance obtained by adding together the transmission distance between adjacent AWCs and the lobe length within the AWC concerned. Thus, the above conventional system does not sufficiently consider an extension of transmission line.

SUMMARY OF THE INVENTION

It is an object of the present invention to allow a desired transmission line extension and an independent determination of the transmission distance of a ring trunk cable between adjacent line concentrators and the total transmission distance of ring lobes of the line concentrator concerned, to thus facilitate the setting-up or installation of a ring transmission line.

According to one aspect of the present invention, in order to achieve the above object, a line concentrator is provided with a signal regenerator at or before a branch point where the transmission line branches from the ring trunk line to the ring lobe of the line concentrator, to accordingly regenerate an attenuated signal on the ring trunk line and send it to the ring lobe.

Provision of a signal regenerator in a line concentrator has been thought of by the present inventors based on the observation that insufficient function of regenerating an attenuated signal on the transmission line has caused a problem of the above-described prior art technique: Namely, it is necessary to set up a ring transmission line, with a limitation that the transmission distance should be determined so as to be within the total transmission distance obtained by adding together the transmission distance from a certain line concentrator to the immediately downstream line concentrator and the length of a ring lobe of the immediately downstream line concentrator.

The signal regenerating circuit provided within a line concentrator and constructed as above operates to regenerate a signal sent via the ring trunk cable and received at the line concentrator and send the regenerated signal to the ring lobe. As a result, the transmission line distance from the line concentrator to the immediate downstream line concentrator and the total transmission line distance of ring lobes of the line concentrator concerned can be determined separately and independently from each other. Also such transmission line distances can be determined separately and independently with respect to each line concentrator. Therefore, setting up of the system becomes easy and the transmission distance can be elongated.

BRIEF DESCRIPTION OF THE DRAWINGS

FIG. 7 is a circuit diagram of the ring switch of the line concentrator shown in FIG. 4.

DESCRIPTION OF THE PREFERRED EMBODIMENTS

The preferred embodiments of the present invention will now be described with reference to the accompanying drawings.

Figure 1:
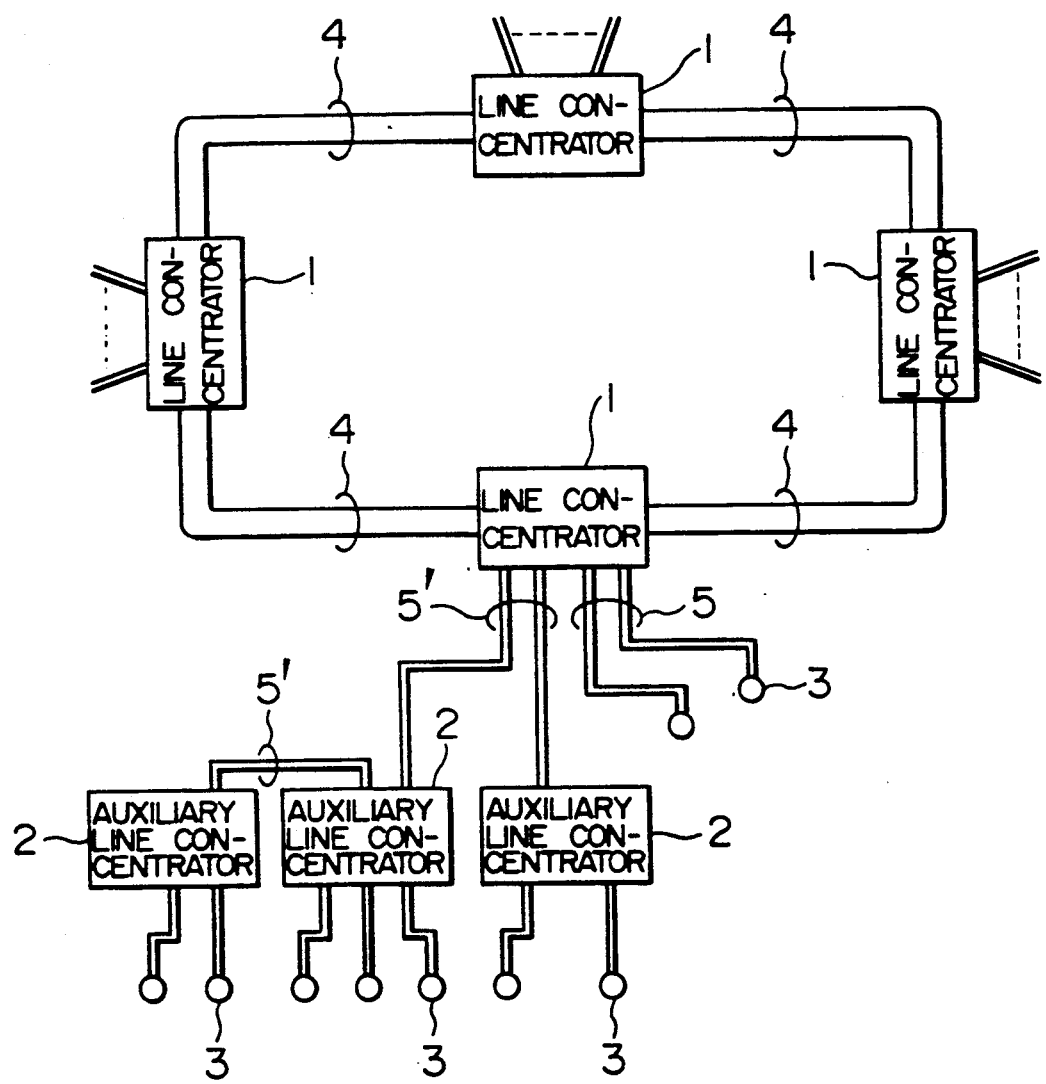
FIG. 1 shows the structure of a ring network system.

FIG. 1 shows the structure of a ring network system. In FIG. 1, a ring network is constructed of line concentrators 1 interconnected by a ring trunk line 4. The ring network has ring lobes 5, 5' to which terminal stations 3 and auxiliary line concentrators 2 are connected. An auxiliary line concentrator 2 may connect via a ring lobe 5' additional auxiliary line concentrators. In such a manner, the transmission line of the ring lobe 5' becomes longer.

Figure 2:
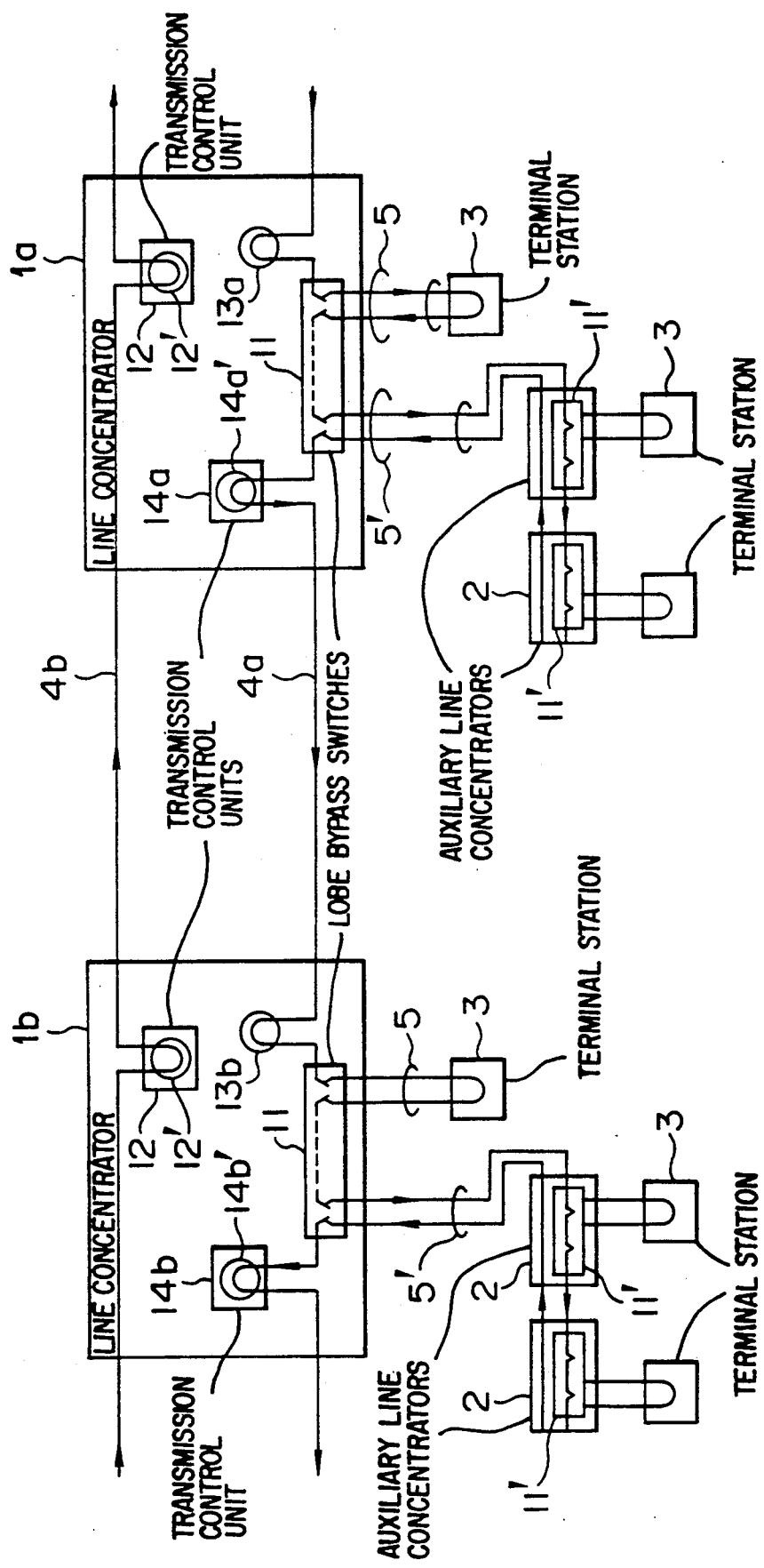
FIG. 2 shows the structure of an embodiment of a ring line concentrator according to the present invention.

FIG. 2 shows a portion of a ring network system wherein an embodiment of line concentrators 1 (1a, 1b) of this invention and the ring transmission line or trunk cable 4 are shown in detail. The ring trunk cable 4 is constructed of a primary transmission line 4a and a secondary transmission line 4b opposite in signal transmission direction with respect to the primary transmission line. The line concentrator 1 (1a, 1b) comprises a signal regenerating circuit 13 (13a, 13b) which is the main subject of this invention, a lobe bypass switch 11, a transmission control unit 14a, 14b, and a transmission control unit 12. The bypass switch 11 inserted in series to the ring trunk cable 4 is used for removing the ring lobe 5, 5' from the trunk cable 4. The transmission control unit 14a, 14b is caused to be connected to the primary transmission line 4a during the ring normal operation, and the transmission control unit 12 to the secondary transmission line 4b. The transmission control units 12, 14a, 14b each constitute a managing station within the line concentrator, have respective signal regenerating circuits 12', 14a', 14b' for regenerating a signal sent from the ring trunk cable in the similar manner to the case of the terminal stations 3, and also have other functions of sending frames to the ring trunk cable, or the like. The transmission control sections 12, 14a, 14b can be realized based on the function described in "TOKEN RING ACCESS METHOD AND PHYSICAL LAYER SPECIFICATIONS" IEEE Standard, 802.5-1985, particularly at pp. 23 to 25, 41 to 58 and 77 to 86, so that the detailed description therefor is omitted. Terminal stations 3 and auxiliary line concentrators 2 are connected to ring lobes 5 and 5' of the line concentrator 1, respectively.

The line concentrator 1 is always powered both during an ordinary operation and during a transmission line failure to remove the failure site from the system. The terminal station 3, which is directly connected to the primary transmission line 4a via the lobe bypass switch 11 under control of the terminal station, is inserted to the ring transmission line 4 at the start of information processing and removed from the primary transmission line 4a at the completion of the information processing. Thus, the length of the ring transmission line 4 within the line concentrator 1 always changes in such a manner, for example, that the length becomes longer by the length of the ring lobe 5 when the terminal station 3 is inserted to the ring transmission line, as compared with the case when the terminal station 3 is not inserted to the ring transmission line. If the terminal station 3 is inserted to the primary transmission line 4a, the terminal station also regenerates a transmitted signal. It is also necessary for the transmission control unit 14b of the line concentrator 1b to be capable of receiving a signal transmitted from the transmission control unit 14a of the immediately upstream line concentrator 14a even if no terminal station is inserted into the ring lobes 5 of the line concentrator 1b and into the auxiliary line concentrators. The transmission length of the ring lobes 5' of the line concentrators 1a, 1b becomes long particularly in the case where a number of auxiliary line concentrators are connected thereto. While a terminal station 3 connected to the auxiliary line concentrator 2 is not powered or is not processing information, the terminal station 3 is removed from the ring lobe 5' by means of the lobe bypass switch 11' of the auxiliary line concentrator 2 concerned. If the terminal station 3 is removed from the lobe 5', no signal regeneration is carried out so that large signal attenuation occurs at the ring lobe 5' if it is long. In view of this, the signal regenerating circuit 13b of the line concentrator 1b connected in series with with the ring trunk cable receives first a signal transmitted from the transmission control unit 14a of the immediately upstream line concentrator 1a, and regenerates the signal attenuated at the ring trunk cable 4a. The regenerated signal is then sent via respective ring lobes transmission control unit 14b of the line concentrator 1b. As a result, the transmission distance between adjacent line concentrators and the total transmission distance of respective ring lobes of each line concentrator can be regarded as a separate and independent transmission distance in setting up or installing the system.

Figure 3:
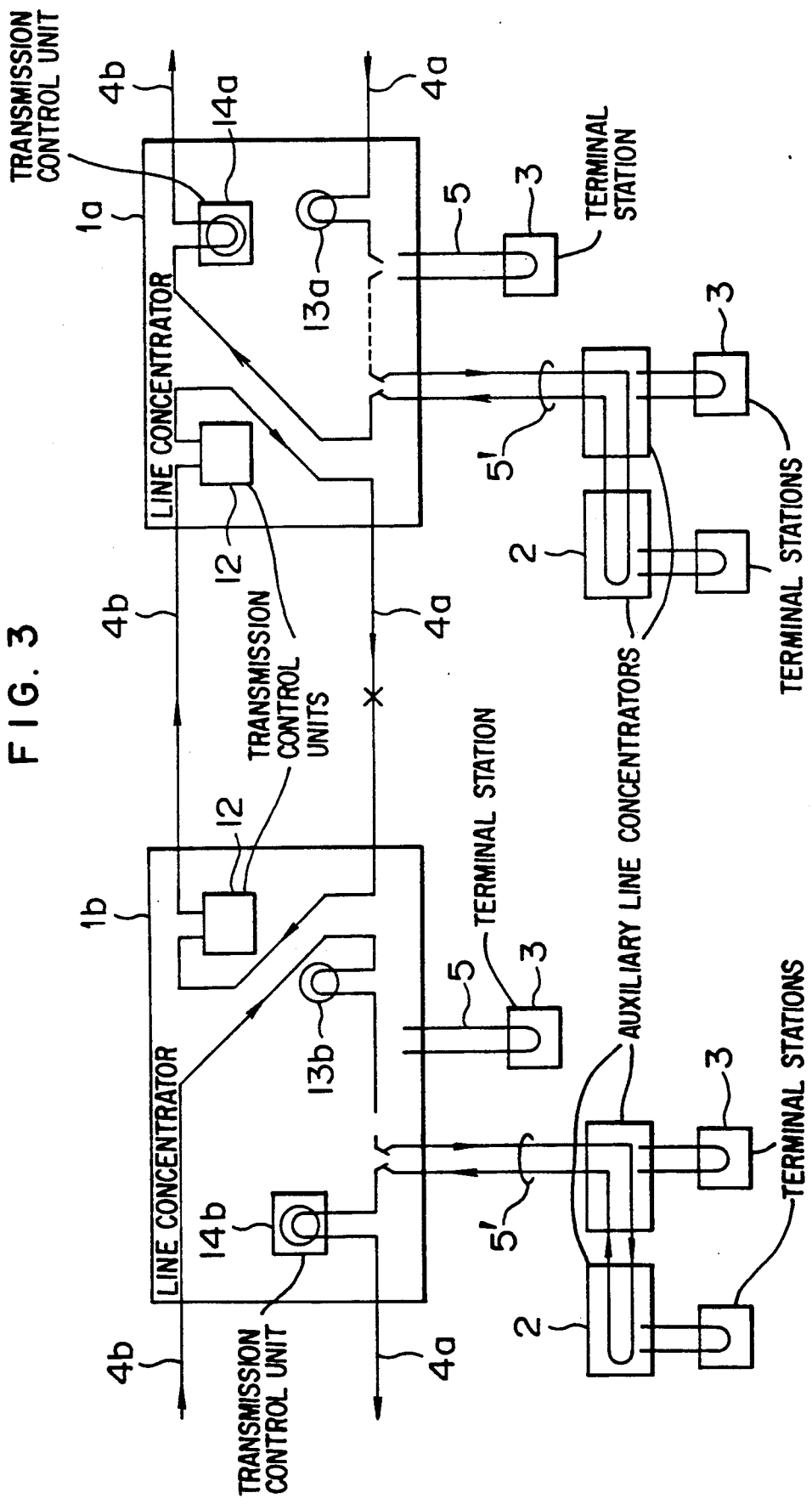
FIG. 3 shows the arrangement of a ring network in looped-back state.

FIG. 3 illustrates a looped-back or ringed-back state of line concentrators when a failure occurs on the transmission line between the line concentrators. Also in this case, an incoming signal from the primary transmission line 4a of the ring trunk cable 4 is first regenerated by the signal regenerating circuit 13a at the position where the ring lobe 5 branches from the primary transmission line 4a. Subsequently, the regenerated signal is transmitted through the lobe 5' which branches off from the line 4a, and thereafter is ringed back via the transmission control unit 14a to the secondary transmission line 4b. On the other hand, an incoming signal from the secondary transmission line 4b of the ring trunk cable 4 is regenerated by the signal regenerating circuit 13b. Subsequently, the regenerated signal is transmitted through the ring lobe 5' which branches off from the line 4a, and thereafter is ringed back via the transmission control unit 14b to the primary transmission line 4a. Thus, the transmission distance can be considered as the same as that of the normal state described with FIG. 2, even in the ring looped-back state.

Figure 4:
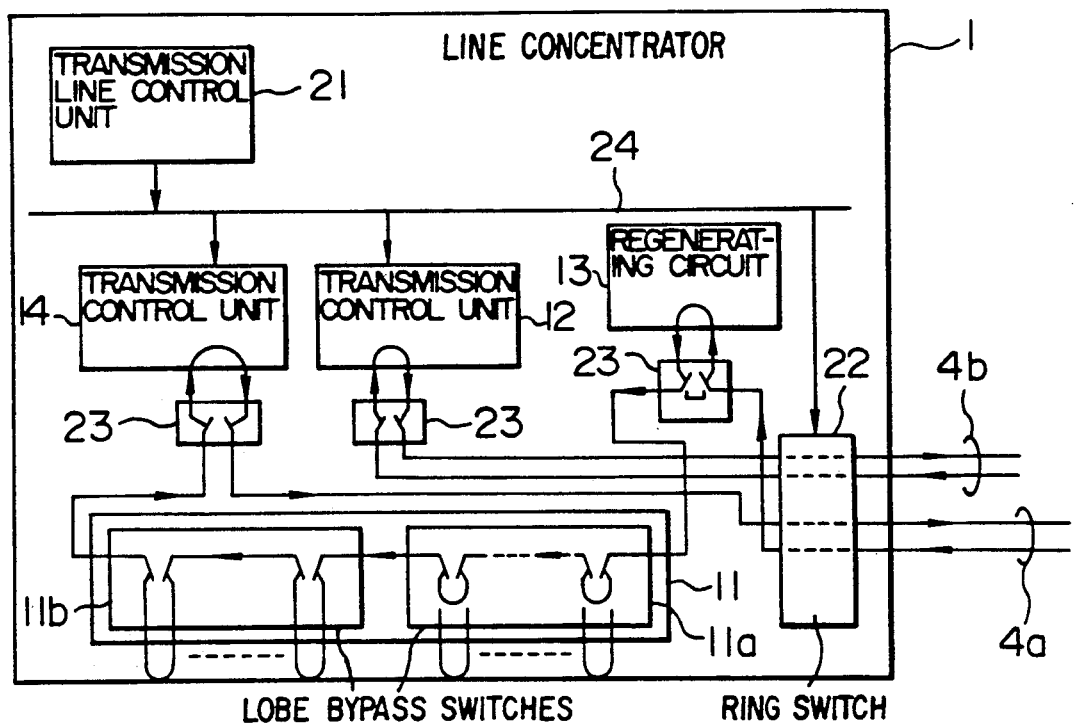
FIG. 4 shows the detailed structure of a line concentrator.

FIG. 4 shows the detailed structure of the line concentrator of this invention. A signal inputted from the primary transmission line 4a, after the line concentrator 1 is powered on, is applied to the signal regenerating circuit 13 via a ring switch 22 and via a signal regeneration switch 23 for connecting the ring trunk cable to the signal regenerating circuit 13. The signal regenerated by the signal regenerating circuit 13 is sent via the lobe bypass switch 11 to terminal stations 3 and auxiliary line concentrators. The lobe bypass switch 11 includes lobe bypass switches 11a for connection only to terminal stations, and lobe bypass switches 11b for connection only to auxiliary line concentrators 2 The lobe bypass switch 11 is ordinarily controlled to send a signal to terminal stations 3. The above arrangement can be realized based on a known method proposed, e.g., in JP-A-61-208334.

The arrangement of the lobe bypass switch 11 and its associated circuit portions, constructed in accordance with the above-described known method, will be described with reference to the drawings.

Figure 5:
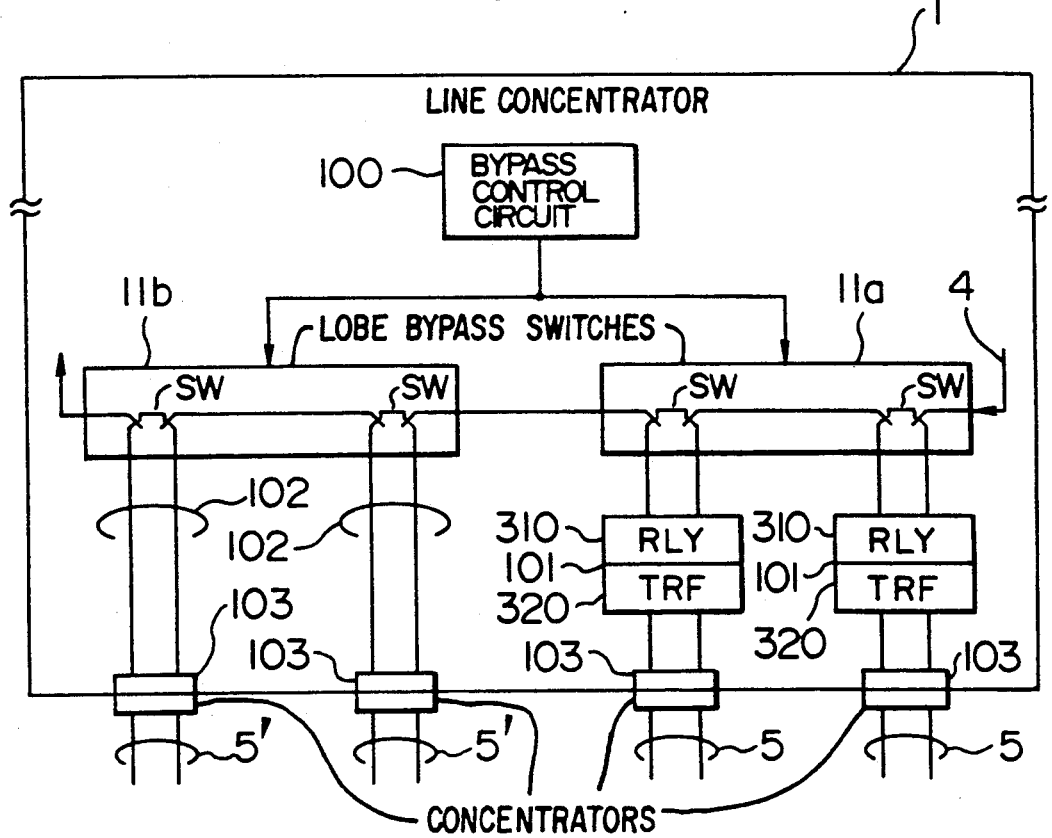
FIG. 5 is a circuit diagram showing a lobe bypass switch of the line concentrator of this invention.

FIG. 5 shows the lobe bypass switch 11 of a line concentrator and only, those circuit portions associated therewith. Terminal stations are connected to ring lobes 5, and auxiliary line concentrators are connected to ring lobes 5'. A bypass control circuit 100 controls lobe bypass switches 11a, 11b. A transformer-coupled interface unit 101 operates to connect the ring lobes 5 and lobe bypass switches 11a. Connectors 103 connect the transformer-coupled interface unit 1 and an auxiliary line concentrator connecting interface unit 102 to respective ring lobes 5, 5'. The transformer-coupled interface unit 101 has a transformer (TRF) 320 and a relay (RLY) 310 which switches the transmission line to the ring lobe under control of an operation control unit of the terminal station.

Figure 6:
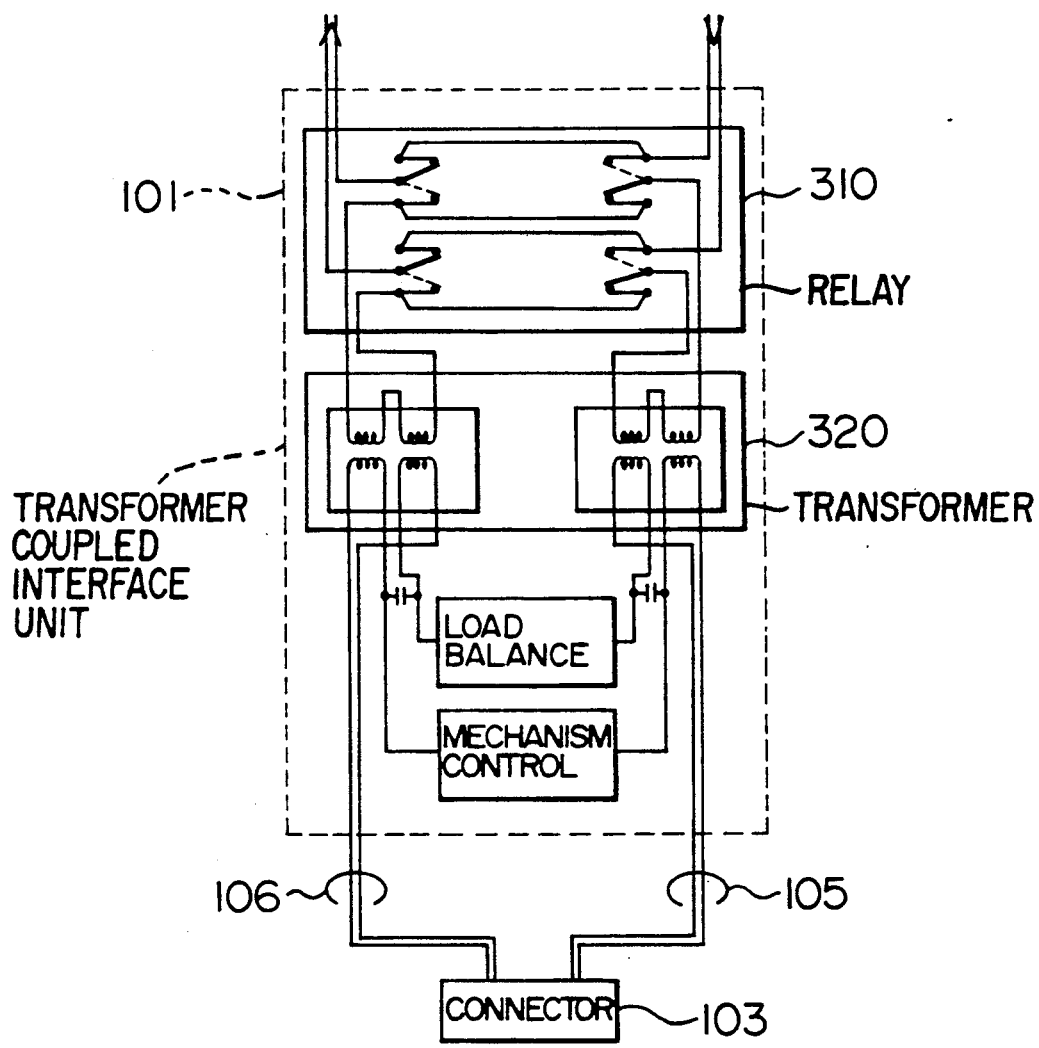
FIG. 6 is a circuit diagram of the transformer-coupled interface unit shown in FIG. 5.

FIG. 6 is a circuit diagram of the transformer-coupled interface unit 101. This circuit is equivalent to the Trunk Coupling Unit shown in FIG. 12 of "TOKEN RING ACCESS METHOD AND PHYSICAL LAYER SPECIFICATIONS" IEEE Standard 802.5-1985. In operation, if the line concentrator 1 is in an operation enabled state, all the lobe bypass switches 11a, 11b for bypassing the ring lobes 5, 5' are open as shown in FIG. 5 so that the information on the ring trunk cable 4 is sent to the ring lobes. In case of an abnormal state of a ring lobe, the lobe bypass switches 11a, 11b operate to bypass the abnormal lobe from the transmission line under control of the bypass control circuit 100. All the lobe bypass switches are open in an orginary state.

In this state, if a terminal station 3 is inserted to the ring lobe 5 and a d.c. signal is sent therefrom, the transformer-coupled interface unit 101 of the line concentrator 1 causes the relay 310 to connect the transmission line to the ring lobe, thus changing the transmission bypass state to the state that the ring lobe 5 is used as a part of the ring trunk line. If a terminal station is not inserted and no d.c. signal is supplied, the relay 310 operates to maintain the transmission bypass state. In other words, it becomes possible to automatically connect or disconnect a ring lobe to and from the transmission line depending upon the insertion of the terminal station 3 to the ring lobe 5. If an auxiliary line concentrator 2 is inserted to the ring lobe 5', the auxiliary line concentrator connecting interface unit 102 causes the transmission line to extend up to the auxiliary line concentrator 2 side and perform configuration of a necessary ring transmission line. If an auxiliary line concentrator 2 is not inserted to the ring lobe 5', the transmission line is looped back at the connector 103 of the ring lobe 5' to perform configuration of a necessary ring transmission line.

The transformer-coupled interface unit 101 will be described in detail with reference to FIG. 6. A signal line 105 is connected to a receiver unit of the terminal station 3 via the connector 103, and a signal line 106 is connected to a driver unit via the connector 103. In the state where the contacts of the relay 310 take the positions as shown in solid lines in FIG. 6, the ring trunk line 4 bypasses the transformer 320 and is looped back via the contacts of the relay 310. In the state where the contacts of the relay 310 take the positions as shown in broken lines, the ring trunk line 4 is connected to the terminal station via the transformer 320, signal lines 105, 106, and ring lobe 5.

The ring switch 22 is constructed of transmission switching relays for obtaining the ring looped-black state as shown in FIG. 3.

FIG. 7 shows the detail of the ring switch 22 together with the ring lobe bypass switch 11, signal regenerating circuit 13 and transmission control units 12, 14. Elements designated by 61a, 61b, 61c and 61d represent a relay for switching the transmission line under control of the transmission control unit 12. To realize the ring looped-back state shown in the left half of FIG. 3, the contacts of respective transmission line switching relays are made to take the positions as shown by solid lines, whereas the ring looped-back state shown in the right half is realized by the positions shown by broken lines.

Referring additionally to FIGS. 3 and 7, the procedures will be described, by which procedures reconfiguration of the ring trunk cable is performed so as to satisfy the state shown in FIG. 3 when a failure occurs on the primary transmission line 4a of the ring trunk cable 4 at the position as indicated in FIG. 3. A beacon MAC frame as described in IEEE Standard 802.5-1985 at pp. 27 and 37 is being transmitted from the transmission control unit (managing station) 14b of the ring concentrator 1b toward the downstream of the primary transmission line 4a, circulated around the primary transmission line to the line concentrator 1a, and eventually the beacon MAC frame reaches the failure site of the primary transmission line 4a, but never returns back to the transmission control unit 14b of the line concentrator 1b. If the MAC frame does not reach the transmission control unit 14b of the line concentrator 1b even after a predetermined lapse from the time the MAC frame was transmitted, then the transmission control unit 14b regards the primary transmission line failure unrecoverable and in order to establish the ring loopedback state, it stops transmission (data streaming) of data from the transmission control unit 12 to the secondary transmission line. The transmission control unit 12 of the line concentrator 1a in turn detects an absence of data streaming on the secondary transmission line 4b, and controls the transmission line switching relays 61a to 61d in the manner as described with FIG. 7 such that the primary transmission line 4a within the line concentrator 1a is looped back to the secondary transmission line 4b as shown in FIG. 3. As a result, the MAC frame continuously transmitted from the line concentrator 1b is ringed back at the line concentrator 1a and returned to the secondary transmission line 4b to be received by the transmission control unit 12 of the originating line concentrator 1b. Upon reception of the MAC frame by the transmission control unit 12 of the line concentrator 1b, the transmission control unit 12 defermines that one of the line concentrators on the ring trunk cable performed a ring loop-back, and controls the transmission line switching relays 61a to 61d to loop back the secondary transmission line 4b within the line concentrator 1b to the primary transmission line 4a. With the above procedures, the connection arrangement between the line concentrators becomes as shown in FIG. 3 so that reconfiguration of a communication ring with the failure site removed from the ring network system can be performed, and the operation of the system starts again.

A signal from the ring lobe 5, 5' is applied to the transmission control unit 14. The transmission control unit 12 is constructed in the same manner as the transmission control unit 14, and can be realized based on the function described in "TOKEN RING ACCESS METHOD AND PHYSICAL LAYER SPECIFICATIONS" IEEE Standard 802.5-1985, particularly at pp. 23 to 25, 41 to 58 and 77 to 86, so that the detailed description therefor is omitted. The transmission control units 14, 12 and other elements described so far are connected to a common bus 24 and controlled by a transmission line control unit 21. The transmission line control unit 21 may employ a generally known method of controlling peripheral devices in accordance with programs using microprocessors or the like.

Figure 8:
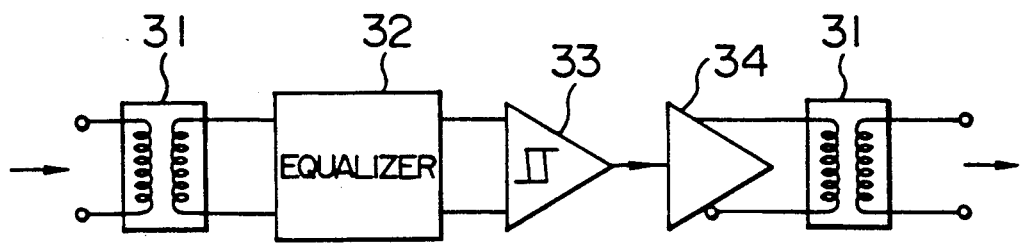
FIG. 8 shows the detailed structure of the signal regenerating circuit.

FIG. 8 shows an example of the arrangement of the signal regenerating circuit 13. A pulse transformer 31 shuts off the d.c. component of a signal on the transmission line and picks up only an a.c. signal. An equalizer 32 has a frequency characteristic as described in IEEE 802.5-1985 at pages 80–82, and sends the signal to a comparator 33 having a hysteresis characteristic. The above circuit elements discriminate and regenerate a signal. A signal driver 34 shapes the waveform of the discriminated and regenerated signal and sends it out. These elements are generally known and already realized.

In the above embodiments, the ring lobes 5, 5' are coupled to the ring trunk line via the lobe bypass switches which are controlled by the bypass control circuit 100. However, the ring lobes 5, 5' may be directly coupled to the ring trunk line, or the lobe bypass switches may use manual switches.

According to the present invention, in setting up or installing a ring. the transmission distance between line concentrators and the total transmission distance of eing lobes of a line concentrator concerned can be separately and independently calculated so that the transmission distance of the ring system can be extended to an advantage.

I claim:

1. A line concentrator to be connected to a ring trunk cable of a ring network and accommodating at least one ring lobe, comprising:

first means coupled in series to said ring trunk cable, for regenerating a signal transmitted on said trunk cable upstream of said first mean sand received by said first means, and sending said regenerated signal to said trunk cable downstream of said first means;

means for connecting in series said ring lobe to said trunk cable at a site downstream of said first means; and a transmission control unit coupled to said ring trunk cable at a site downstream of said connecting means, said transmission control unit including second means for regenerating a signal transmitted on said ring trunk cable upstream of said transmission control unit and sending said regenerated signal to said ring trunk cable downstream of said transmission control unit.

2. A line concentrator according to claim 1, wherein said first means comprising:

a first signal transformer connected to said ring trunk cable, for picking up and a.c. component of said signal transmitted on said ring trunk cable upstream of said first means;

an equalizer coupled to an output of said first signal transformer;

a comparator coupled to an output of said equalizer;

a driver for shaping a waveform of an output signal from said comparator and driving a second signal transformer connected to said comparator; and said second signal transformer coupled to said trunk cable.

3. A line concentrator connected in series to two transmission lines of a ring network opposite in signal transmission direction and accommodating at least one ring lobe, comprising:

first means coupled in series to one of said two transmission lines, for regenerating a signal transmitted on said one transmission line upstream of said first means and sending said regenerated signal to said one transmission line downstream of said first means;

means for in series said ring lobe to said one transmission line at a site downstream of said first means;

a first transmission control unit coupled in series to said one transmission line at a site downstream of said coupling means, said first transmission control unit including second means for regenerating a signal on said one transmission line upstream of said first transmission control unit and sending said regenerated signal to said one transmission line downstream of said first transmission control unit; and a second transmission control unit coupled to the other of said two transmission lines, said second transmission control unit including third means for regenerating a signal transmitted on said other transmission line upstream of said second transmission control unit and sending said regenerated signal to said other transmission line downstream of said second transmission control unit.

* * * * *